United States Patent
Ross et al.

[15] 3,646,967
[45] Mar. 7, 1972

[54] DIVERTER VALVE STRUCTURE

[72] Inventors: Louis E. Ross, Sunland; John K. Lyon, Pasadena; Julius J. Paolucci, Canoga Park, all of Calif.

[73] Assignee: Price-Pfister Brass Mfg. Co., Pacoima, Calif.

[22] Filed: Apr. 6, 1970

[21] Appl. No.: 25,632

[52] U.S. Cl. ................................................137/625.47
[51] Int. Cl. .................................................F16k 11/00
[58] Field of Search ............... 137/625.47, 625.49, 625.48, 137/608; 251/119, 325

[56] References Cited

UNITED STATES PATENTS

| | | | |
|---|---|---|---|
| 3,168,109 | 2/1965 | Klingler | 137/625.48 X |
| 476,170 | 5/1892 | Renton | 251/119 X |
| 1,886,889 | 11/1932 | Krupp | 137/625.47 X |
| 2,370,371 | 2/1945 | Pratt et al. | 251/325 X |
| 2,906,293 | 9/1959 | Fraser et al. | 137/625.47 X |
| 3,026,907 | 3/1962 | Klingler | 251/325 X |
| 3,096,788 | 7/1963 | Talbot et al. | 137/625.42 X |
| 3,165,122 | 1/1965 | Sachnik | 137/625.47 |
| 3,324,879 | 6/1967 | Bucknell et al. | 251/325 X |

*Primary Examiner*—Samuel Scott
*Attorney*—Flam and Flam

[57] ABSTRACT

A common casting provides hot and cold water inlets to a mixer valve and two outlet ports, one for the shower and the other for the tub. The casting provides a chamber for a hollow diverter valve member. The diverter valve member has a lateral outlet at one end registrable selectively with the tub and shower ports. An inlet to the interior of the hollow diverter valve member is formed at the other end. Peripheral O-rings on opposite sides of the inlet provide a seal. These O-rings are located in eccentric grooves so that a lateral thrust is imposed on the diverter valve member. The thrust seals the lateral outlet and prevents undesired flow to the opposite outlet port.

8 Claims, 7 Drawing Figures

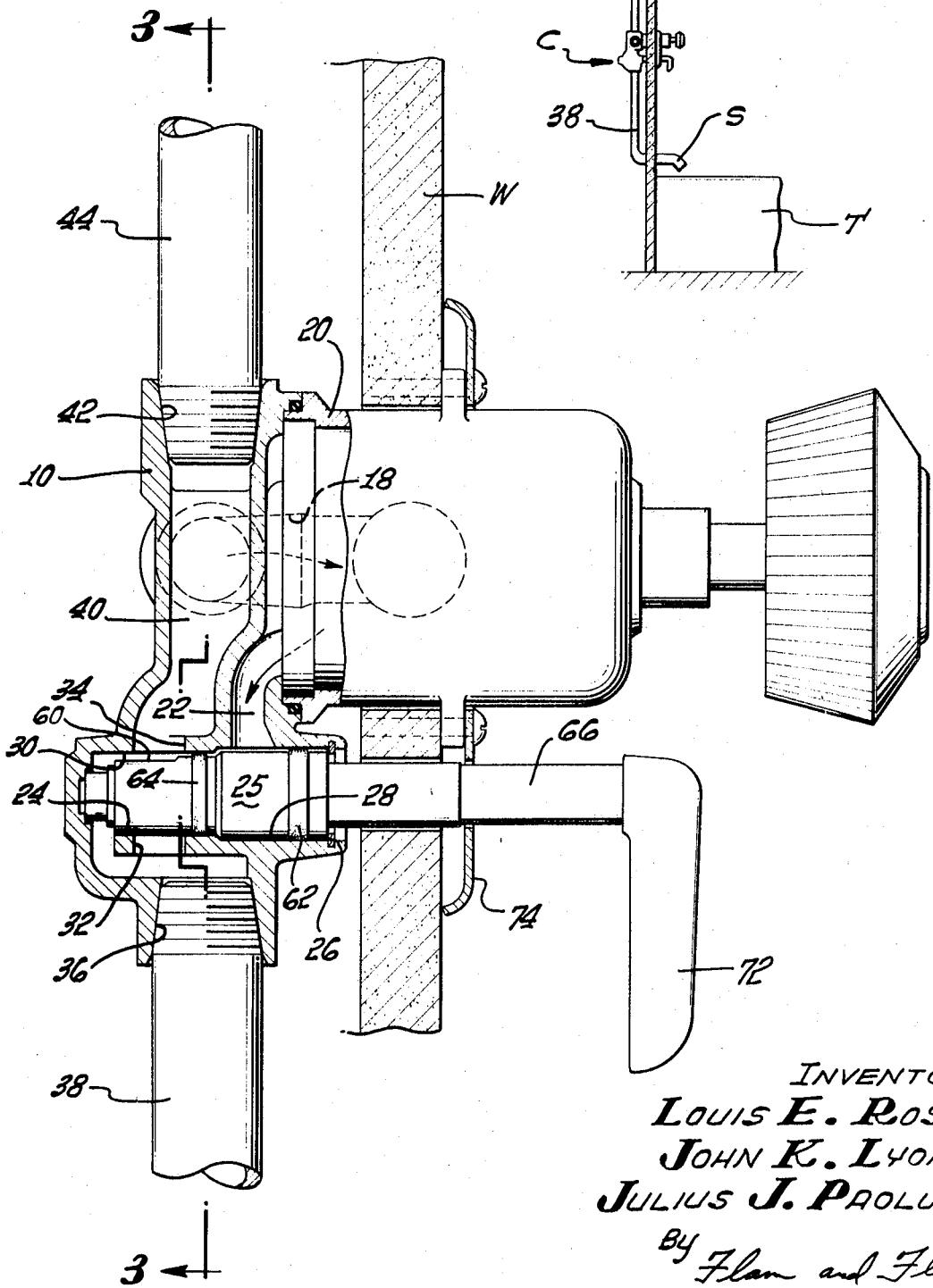

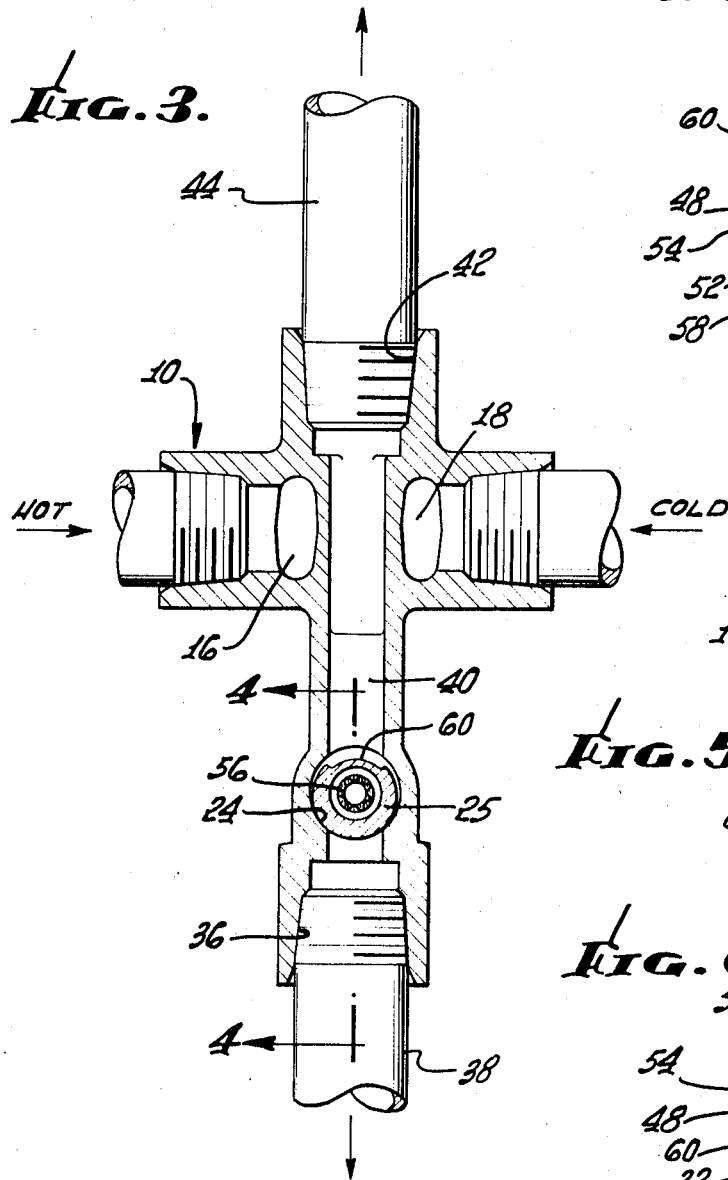
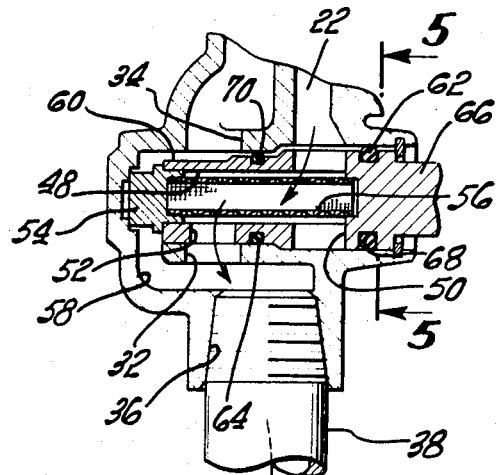
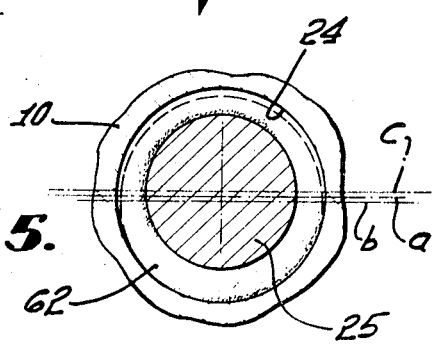
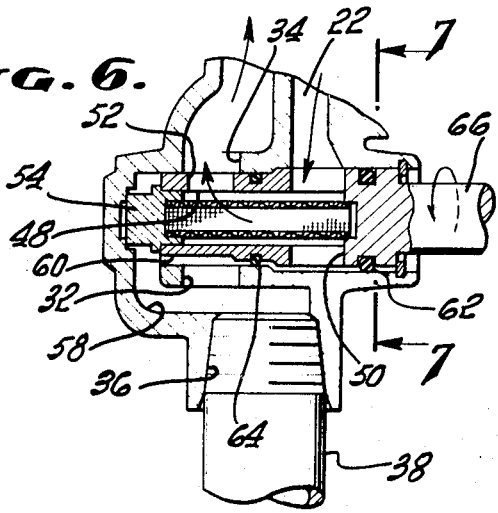
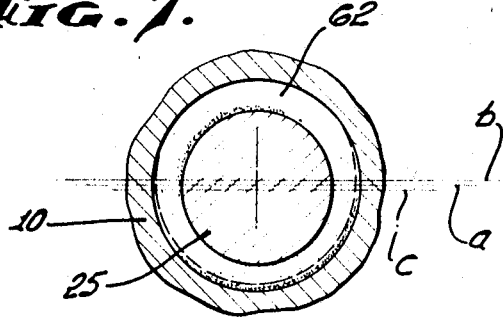

3,646,967

DIVERTER VALVE STRUCTURE

BACKGROUND OF THE INVENTION

This invention relates to plumbing fixtures and particularly to a diverter valve structure for a combined tub and shower installation.

The function intended to be accomplished is to prevent leakage of water to the tub spout while the shower head is used and to prevent leakage of water to the shower head while the tub spout is used. Accomplishing this function is simple enough; the problem is to achieve it with the utmost of simplicity. Thus, the primary object of this invention is to provide a simple diverter structure that efficiently and effectively controls the course of water.

BRIEF SUMMARY OF THE INVENTION

In order to accomplish the foregoing objective, we use a simple hollow plug valve member having a lateral inlet at one end and a lateral outlet at the other. The outlet selectively registers with shower and tub ports on opposite sides according to the angular position of the valve member. O-ring structures that seal the inlet provide a lateral thrust that urges the lateral outlet of the valve member against the bore in which the valve member is accommodated. A tight sealing engagement at the lateral outlet port is thus ensured. The lateral thrust is produced by locating the sealing O-rings in eccentric grooves so that the O-rings protrude on that side of the valve member opposite the lateral outlet port. The valve member is tight only on one side and, hence, can be readily moved between opposite diverter valve positions.

BRIEF DESCRIPTION OF THE DRAWINGS

A detailed description of the invention will be made with reference to the accompanying drawings. These drawings, unless described as diagrammatic or unless otherwise indicated, are to scale.

FIG. 1 is a fragmentary sectional view of a combined tub and shower installation.

FIG. 2 is an enlarged vertical sectional view of the diverter valve structure.

FIG. 3 is a transverse sectional view taken along a plane corresponding to line 3—3 of FIG. 2.

FIG. 4 is a fragmentary sectional view taken along a plane corresponding to line 4—4 of FIG. 3.

FIG. 5 is an enlarged sectional view taken along a plane corresponding to line 5—5 of FIG. 4.

FIG. 6 is a view similar to FIG. 4 but showing the diverter valve in a position opposite to that shown in FIG. 4.

FIG. 7 is a sectional view similar to FIG. 5 but taken along a plane corresponding to line 7—7 of FIG. 6.

DETAILED DESCRIPTION

The following detailed description is of the best presently contemplated mode of carrying out the invention. This description is not to be taken in a limiting sense, but is made merely for the purpose of illustrating the general principles of the invention since the scope of the invention is best defined in the appended claims.

FIG. 1 shows a tub T having a filler spout S. Above the tub is a shower head H. The spout S and shower head H both project from a wall W forming a part of the enclosure for the tub and shower. Water is supplied either to the spout S or head H from a control valve assembly C that includes a mixer valve and a diverter valve. The control valve includes a main casting 10 located behind the wall W. The casting 10, as shown in FIG. 3, has lateral hot and cold water inlet openings. Passages 16 and 18 conduct the hot and cold water to the front face of the casting for proportion control by a mixing valve accommodated in a companion casting 20.

The mixed water emerges from the mixing valve at the front face of the casting 10. A duct 22 carries the water to a bore 24 for traffic control by a diverter valve member 25 mounted in the bore.

The bore 24 is substantially cylindrical, having a frontal opening 26 located just beneath the mixer valve casting 20. The bore 24 has an outer larger diameter part 28 and an inner smaller diameter part 30. The mixed water enters the outer larger diameter part 28. At the inner smaller diameter part 30 are two diametrically oppositely disposed ports, one a tub port 32 and the other a shower port 34. The tub port 32 on the lower side communicates with a threaded opening 36. A pipe 38 connects the opening 36 to the tub spout S. The shower port 34 communicates with an extended passage 40 that is located behind the mixer valve and that terminates in a threaded opening 42. A pipe 44 connects the opening 42 to the shower head.

The diverter valve member 25 (FIGS. 4 and 6) is generally cylindrical with an outer larger diameter end and an inner smaller diameter end. The inner end and the adjoining part of the outer end are hollow to provide a control chamber 48. The mixed water from the duct 22 enters the chamber 48 through one end of a through transverse bore 50. At the other end, the chamber 48 has a lateral outlet port 52 registrable either with the tub port 32 (FIG. 4) or the shower port 34 (FIG. 6). At both positions the transverse bore 50 is operative. At intermediate angular positions the flow of water is throttled. Tub flow is fully cut off before shower flow begins, and vice versa. Hence, the diverter valve member 25 operates as a volume control. The mixer valve, however, preferably incorporates means for shutting off all flow.

The inner end of the chamber 48 is closed by a cap 54. A silencer screen 56 is supported in the chamber 48.

When water is directed to the tub spout (FIG. 4) an aspirator effect draws water from the conduit to the shower head. A groove 58 connects the opening 36 to the bottom of the bore 24. A notch 60 on the end of the diverter valve is operative in the position of FIG. 4 to connect the shower port 34 and the groove 58. The flow of water through the tub opening 36 subjects the groove 58 and thus the shower port 34 to a negative pressure and any water at the port 34 is drawn off.

Two O-rings 62 and 64 are carried in spaced relationship on the exterior of the diverter member 25 to encompass and to seal the duct 22. The grooves 68 and 70 in which the O-rings 62 and 64 are accommodated are shallower on the side of the diverter member 25 opposite the control port 52. This is achieved, in this instance, by forming the grooves eccentrically as shown in FIG. 5. Optionally, a flat can be formed in the grooves. Since the grooves are shallower on the side opposite the control port 52, the O-rings protrude. Compression of the O-rings 62 and 64 on this side produces a net transverse or lateral thrust that tends to urge the edges about the control port 52 firmly into engagement with the walls of the bore. A thoroughly reliable seal is achieved as the clearances reduce to zero on the control port side while the clearances open at the opposite side. The lateral clearances shown in FIGS. 4 and 6 are exaggerated. When the valve is in the shower position (FIG. 6) very little, if any, water escapes to the tub spout.

The line *a* in FIGS. 5 and 7 shows the center of the bore 24; the line *b* shows the center of the diverter valve 25; and the line *c* shows the center of the eccentric grooves for the O-rings.

The stem 66, as shown in FIG. 2, carries a handle 72 by the aid of which the requisite manipulations are achieved. Suitable legends on an escutcheon plate 74 are provided.

We claim:

1. In a diverter valve structure for selectively directing the flow of water to a shower head or a tub spout:
    a. a diverter valve body having a generally cylindrical valve chamber open at one end;
    b. said diverter valve body having means forming a pair of outlets located laterally on opposite sides of said chamber;
    c. a diverter valve member mounted in said chamber for angular movement, said diverter valve member having a control chamber provided with a lateral outlet selectively registrable with said lateral outlets upon angular movement of said diverter valve member, there being slight peripheral clearance between said valve chamber and said diverter valve member;

d. means admitting water into said control chamber; and e. means imposing a lateral thrust on said diverter valve member in a direction to urge the edges of said lateral outlet of said diverter valve member into engagement with the walls of said valve chamber to form a seal;

f. said lateral thrust means comprising resilient ring means carried by said diverter valve member and engaging the walls of said valve chamber, said resilient ring means protruding on the side of said diverter valve member opposite said lateral outlet of said diverter valve member.

2. The diverter valve as set forth in claim 1 in which said water admitting means comprises an opening extending laterally into said valve chamber and a registering opening in said diverter valve member, said openings being located in axially spaced relationship to said lateral outlet of said diverter valve member and said lateral outlets of said valve chamber; said resilient ring means comprising a pair of sealing O-rings located on opposite sides of said openings.

3. The diverter valve as set forth in claim 1 in which said diverter valve member has means forming a channel to provide fluid communication between the side of said diverter valve member opposite its said lateral port and the bottom of said cylindrical valve chamber; one of said diverter valve body outlets being in constant communication with the bottom of said valve chamber whereby suction is applied to the other of said valve body outlets when said lateral outlet of said diverter valve member registers with said one of said diverter valve body outlets.

4. The diverter valve as set forth in claim 1 together with means forming a channel communicating with said tub port at a place spaced from said valve chamber, said diverter valve member having means providing communication between the outside of said diverter valve on the opposite side of its said lateral port and said channel whereby in the tub position of said diverter valve member said tub port is connected to said shower port so that the flow of water through said tub port creates a negative pressure to withdraw water from said shower port.

5. In a diverter valve structure for selectively directing the flow of water to a shower head or a tub spout;

a. a diverter valve body having a generally cylindrical recess;

b. means forming a tub outlet port and a shower outlet port on opposite sides of the bottom of the recess;

c. means forming a lateral inlet port to the recess near the outer end of the recess;

d. a hollow diverter valve member fitted in the recess, there being slight peripheral clearance between said diverter valve member and said recess;

e. said diverter valve member having an inlet opening to the hollow interior registrable with said lateral inlet port of said body;

f. said diverter valve member having a lateral outlet opening from said hollow interior registrable selectively with said tub and shower ports;

g. a pair of O-rings mounted peripherally of said diverter valve member on opposite sides of its said inlet opening, the inner O-ring being located axially between said lateral outlet opening and said inlet opening;

h. said diverter valve member having eccentric grooves for said O-rings whereby said O-rings protrude on the side of said diverter valve member opposite said lateral outlet opening whereby a lateral thrust urges the edges of said lateral outlet opening into sealing relationship with the walls of said recess.

6. The diverter valve as set forth in claim 5 in which:

a. said diverter valve member is relieved on the side opposite said lateral outlet port whereby the tub or shower port opposite the one in registry with said lateral outlet port communicates with the bottom of said recess;

b. means forming a channel between the bottom of said recess and said tub port at a place spaced from the said recess whereby in the tub position, said tub port is connected to said shower port so that the flow of water through said tub port creates a negative pressure to withdraw water from said shower port.

7. The diverter valve as set forth in claim 5 in which said inlet opening is formed by a through transverse bore; angular movement of said diverter valve away from full registry with the recess ports serves to control the volume of flow.

8. The diverter valve as set forth in claim 5 together with a mixer valve mounted on said diverter valve body, said diverter valve body having hot and cold water inlets communicating with said mixer valve, said lateral inlet port to said recess being in communication with the outlet of said mixer valve.

* * * * *